C. D. McDONALD.
METAL SHEARING MACHINE.
APPLICATION FILED MAY 18, 1914.
1,141,644.
Patented June 1, 1915.
5 SHEETS—SHEET 3.
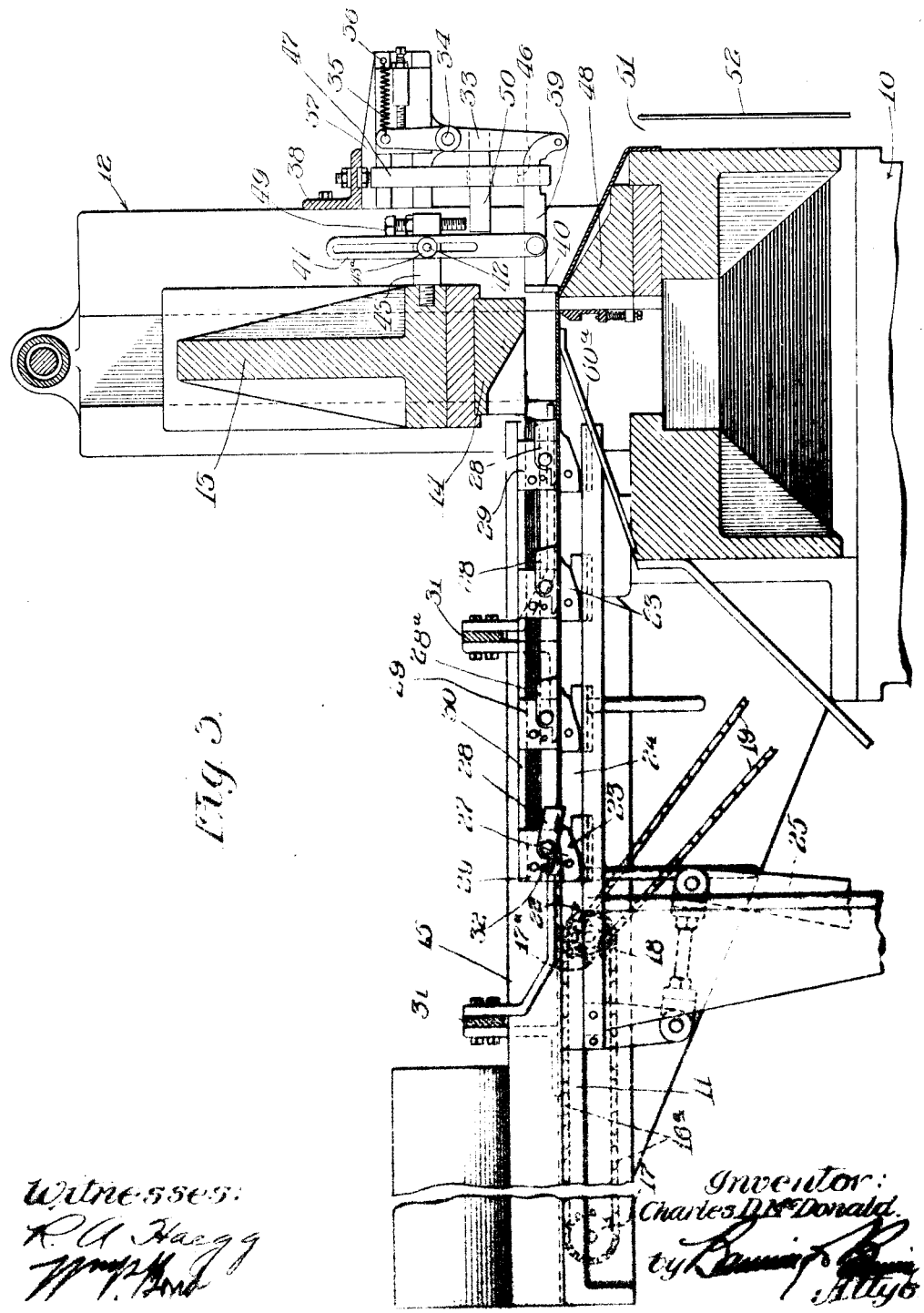

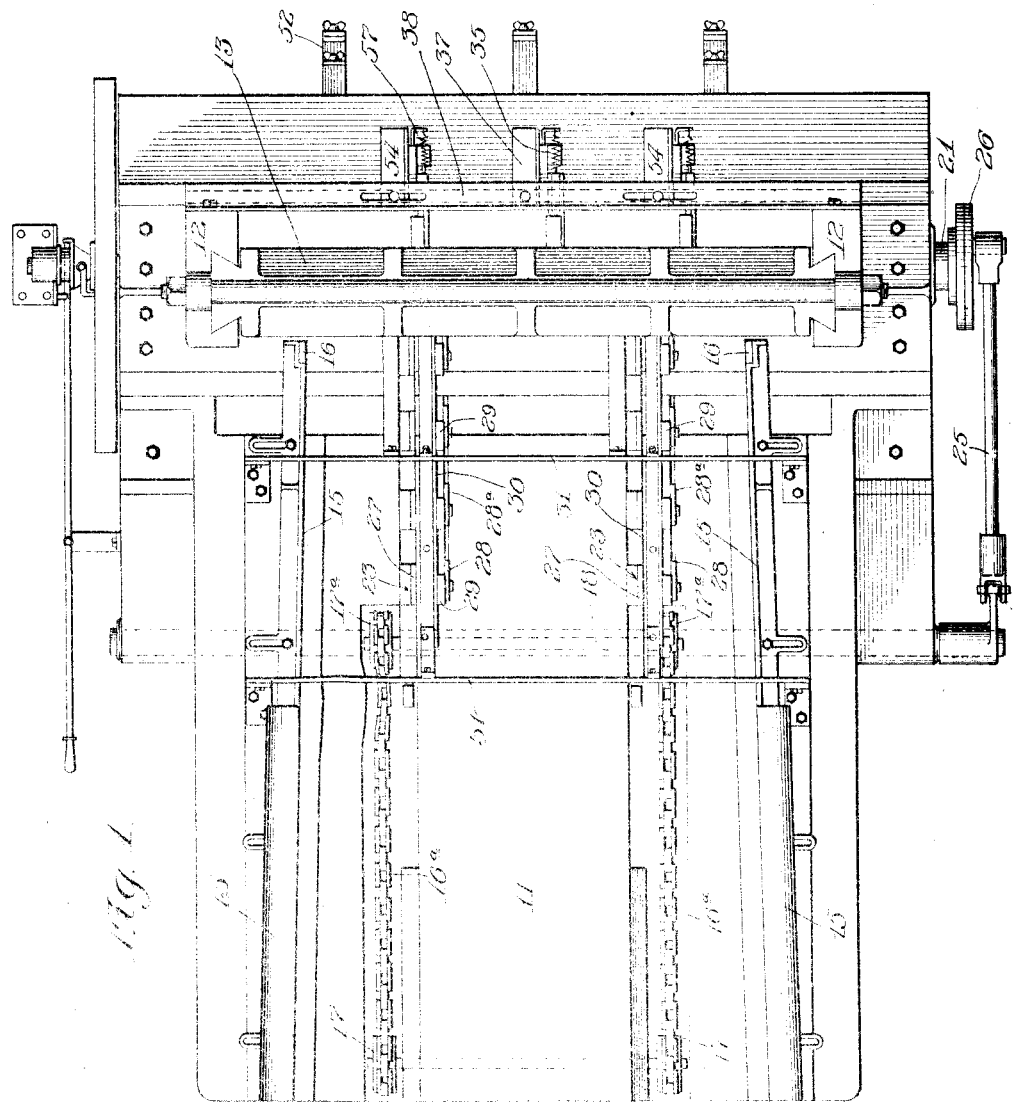

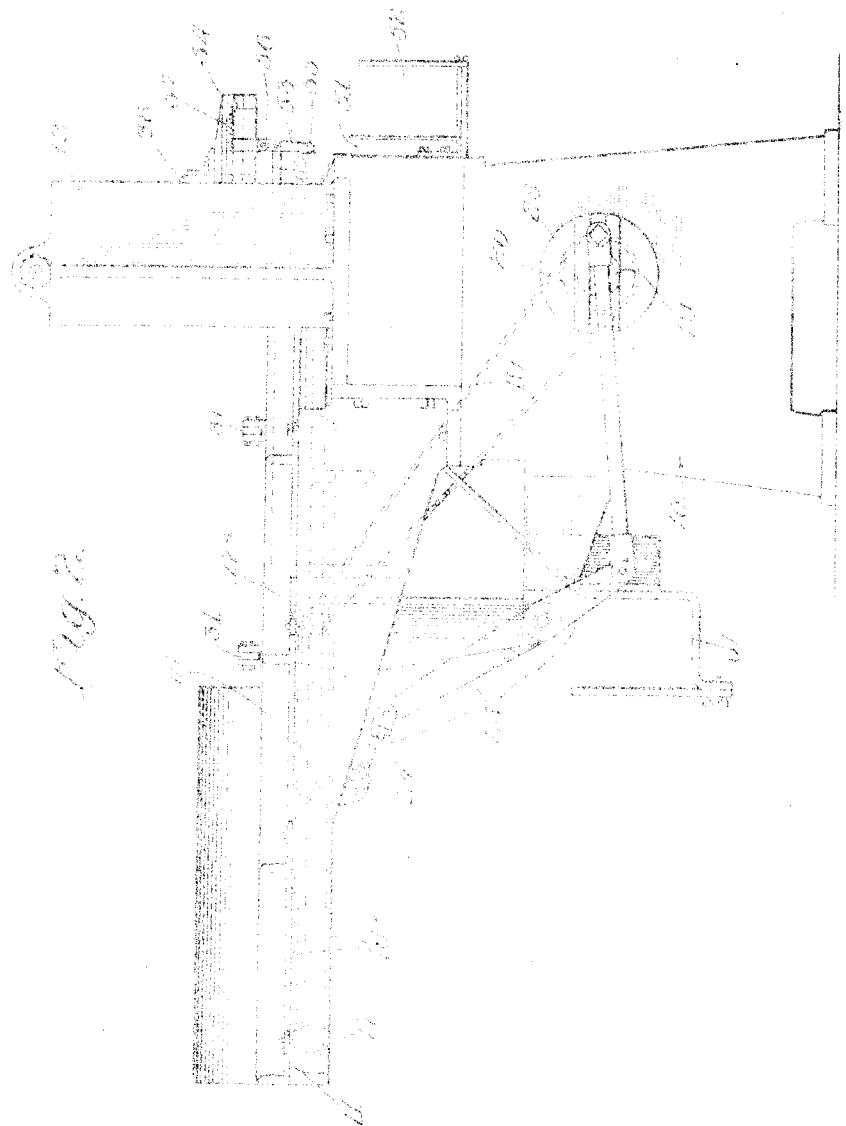

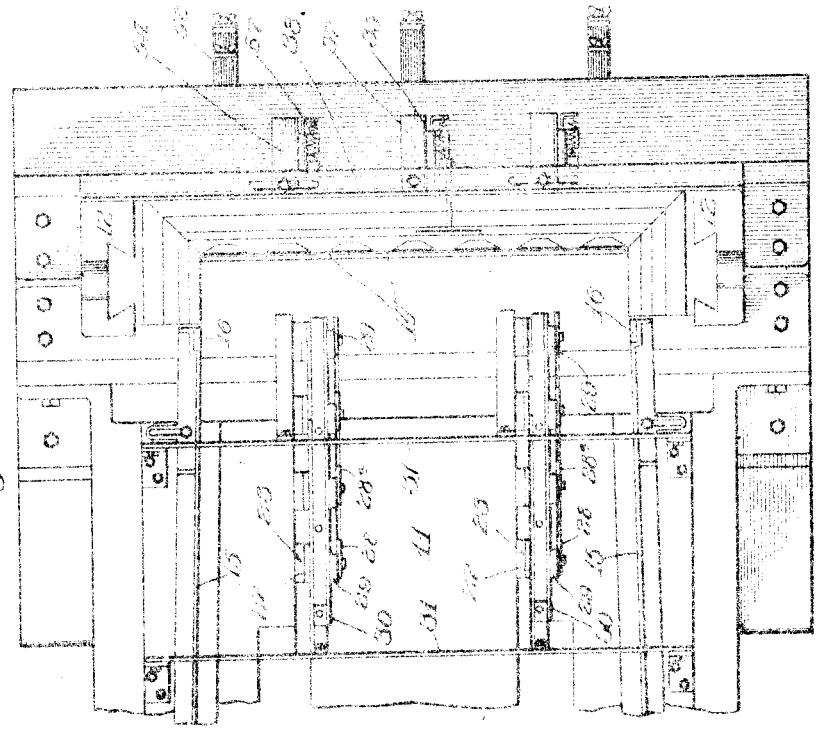
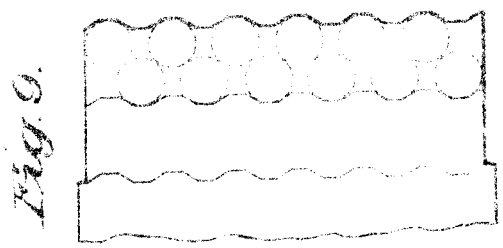

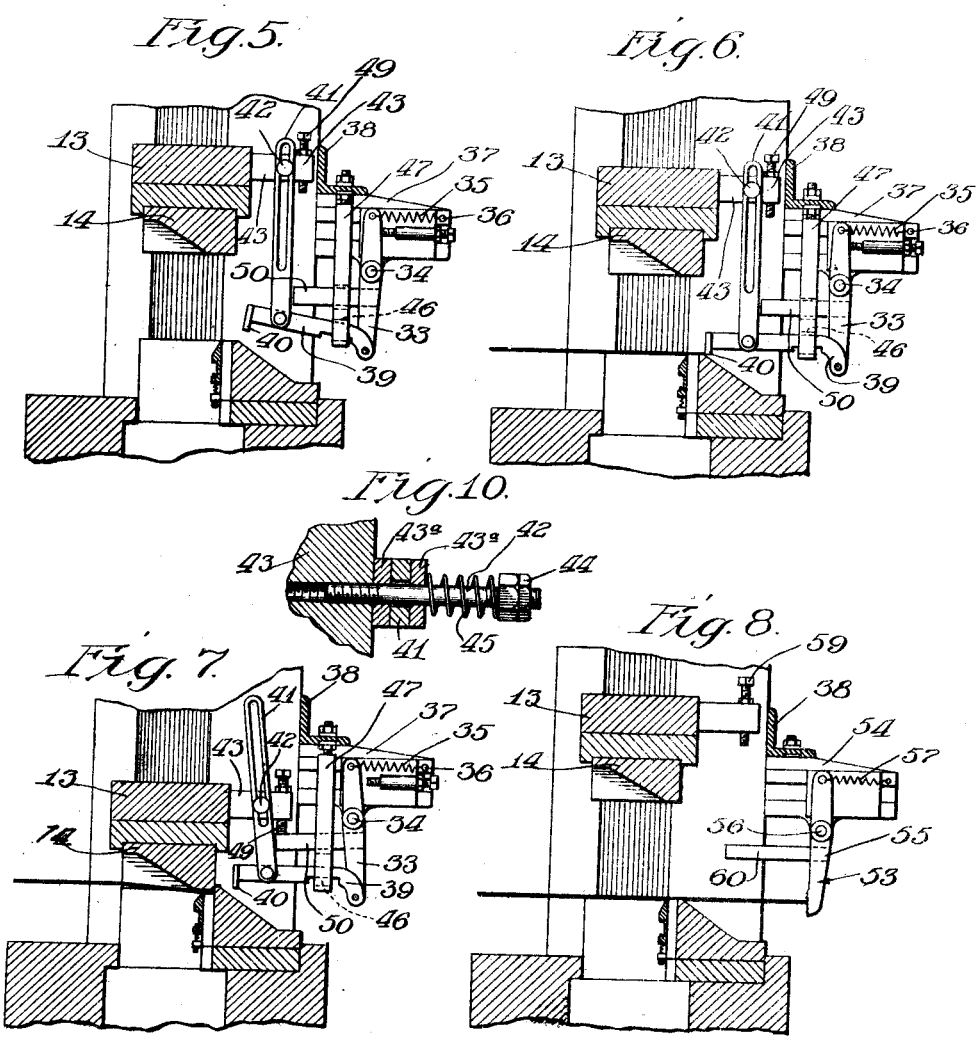

UNITED STATES PATENT OFFICE.

CHARLES D. McDONALD, OF CHICAGO, ILLINOIS, ASSIGNOR TO McDONALD MACHINE CO., OF CHICAGO, ILLINOIS, A CORPORATION OF ILLINOIS.

METAL-SHEARING MACHINE.

1,141,644.   Specification of Letters Patent.   Patented June 1, 1915.

Application filed May 18, 1914. Serial No. 839,408.

*To all whom it may concern:*

Be it known that I, CHARLES D. McDONALD, a citizen of the United States, residing at Chicago, in the county of Cook and State of Illinois, have invented certain new and useful Improvements in Metal-Shearing Machines, of which the following is a specification.

The present invention relates to a machine adapted to cut strips of sheet metal in a certain manner and of predetermined dimensions for the purpose of forming metal blanks or strips.

One of the objects of the present invention is to arrange a series of stop or centering members to accurately and positively center the work with respect to the shearing mechanism.

A further object of the invention is to provide means for feeding the work into position to be acted upon by the shearing mechanism to produce an initial cutting operation which will be in the nature of a trimming cut and to arrange means for centering the work prior to the trimming cut which centering means will be inactive after this trimming operation and to provide other means for centering the work prior to the subsequent or blank producing cutting operation.

A further object of the invention is to construct the members which form the centering means whereby they can be adjusted in conformity to the size of the blank being cut.

A further object of the invention is to provide means for releasing the centering means from engagement with the work, which release will be in synchrony with the movement of the cross head or other member carrying the shearing or cutting die.

A further object of the invention is to utilize a shearing or cutting die which will trim the sides of the work at the same time that the transverse cut is made across the work.

A further object of the invention is to provide suitable receptacles or depositories for the cut blanks.

A further object of the invention is to provide guide rails arranged in converging relation with respect to one another and approaching closest to one another adjacent the die whereby a binding of the work during the feeding movement is eliminated.

A further object of the invention is to provide the inner ends of these guide rails with a hardened metal insert so that they will withstand the action of the edges of the strips passing along.

The invention further consists in the features of construction and combinations of parts hereinafter described and claimed.

In the drawings: Figure 1 is a plan view of a machine embodying the mechanism of the present invention; Fig. 2 is a side elevation of the machine illustrated in Fig. 1; Fig. 3 is a longitudinal section of said machine; Fig. 4 is a detailed plan view of the rear end of the machine showing the cutting or shearing dies; Fig. 5 is a detail showing the position of the middle of the rear centering members prior to the feeding of the work; Fig. 6 is a view similar to Fig. 5 showing the position assumed by said middle centering member when the work has been fed forward; Fig. 7 is a view similar to Fig. 5 showing the position of said middle centering member just after the completion of the initial or trimming cut; Fig. 8 is a detail showing the outer of the rear centering members which operate to center the work with respect to the shearing mechanism upon the feeding movements subsequent to the initial feeding movement; Fig. 9 is a detail showing the form of blank produced by the shearing operation and showing how said blanks are subsequently cut by the die presses to produce the articles desired; and Fig. 10 is a sectional detail of the friction connection between the shearing mechanism and the middle of the rear centering members.

The present invention relates to the art of producing blanks of sheet metal for use in connection with die presses. It has been found necessary to configure such blanks in a certain manner in order to eliminate, as far as possible, the remaining of any substantial amount of material after the die press has operated upon the same. These blanks must necessarily be of accurate dimensions or else they will not properly feed in the die presses or register with the dies and the dies would not properly form the articles desired from the blanks. It has, therefore, been found necessary to arrange a certain positive means for centering the work with respect to the cutting mechanism of these shearing machines, in order to efficiently and accurately produce the blanks, it having been determined in practice that the action of an ordinary feed bar is not sufficiently accurate to properly produce these blanks owing to the element of lost motion which of necessity enters into the operation of an ordinary form of reciprocating feed bar.

Referring now to the drawings, and particularly to Fig. 2, the mechanism is mounted upon a base member or support 10 of any suitable construction and arrangement, and the said mechanism proper consists of a table 11 shown in Figs. 1, 2, and 3, and at the rear of this table are formed upright guides 12 in which operates a reciprocating cutting or shearing mechanism. The shearing mechanism can be actuated by any suitable means well known to the art and detailed description or illustration of such means are not deemed necessary in this instance. The cutting or shearing mechanism consists of the usual sliding block 13 carrying at its lower end a cutting member 14.

Secured to the upper surface of the table 11 are companion guide rails 15 better illustrated in Fig. 1. These rails, as shown, are adjustable in and out with respect to the center of the table, and as also shown, are arranged to converge toward one another from the front to the rear thereof, so that they are in closest relation to one another at the rear end which is adjacent the cutting die.

A block 16 of hard metal is inserted at the rear end of each rail and this block is the portion of the guide which in reality performs the operation of guiding the work to the shearing mechanism. The reason for the converging relation of these guide rails is as follows: It is possible that in initially placing the work on the table the same may be arranged in an oblique position. If the guide rails are parallel this will result in a binding of the work throughout the length of the guide rails and an interference with the proper feeding of the work to the shearing mechanism. If, however, the guide rails are spread apart at their forward end and are contracted to the proper position at their rear end, the work can be fed up to the point of contraction of said rails even if in an oblique position without a binding against the guide rails, sufficient space to accommodate the work when so positioned being allowed. When the rear end is reached the work will then engage the hard metal blocks and be properly positioned with respect to the shearing mechanism and the necessary movement to turn it into correct position is readily allowed owing to the play which the rear end of the work is capable of with respect to the guide rails. Thus by this arrangement a free and easy movement of the work up to the die is secured.

The work is delivered onto the upper surface of the table 11 by means of companion endless members 16ª which in the construction shown are in the form of link belts. These belts or chains travel over suitable sprockets 17 and 17ª and the rear sprockets 17ª are mounted upon a shaft 18 which is driven by a belt 19, driven by a pulley 20, attached to the main power shaft 21. These chains or belts 16 are each provided with a finger 22. In the construction shown only one of these fingers is employed, although it is obvious that one or more may be employed depending upon the length of the work being fed.

These endless members deposit the work upon a table in position where they may be acted upon by the fingers 23 of a reciprocating feed bar 24. This feed bar is actuated by a suitable link or lever connection 25 driven by means of a slotted disk 26 on the power shaft 21. The method of driving this feed bar will be clearly understood by referring to Fig. 2 of the drawings. The first of the fingers 23 is indicated, for the sake of clearness, by the numeral 27, and this finger engages the rear edge of the work and initially advances it toward the shearing mechanism.

As previously explained, it is essential in the operation of these machines to provide means for accurately centering the work with respect to the shearing mechanism and to effect such centering I have in the construction shown provided what may be termed rear centering means and forward centering means. The forward centering means are composed of a series of pivoted fingers 28, and in the construction shown they are arranged in two sets of 4 each, and the corresponding fingers of each set are alined. Each of these fingers are alike in construction and arrangement and each is mounted upon a plate 29, which plate is capable of adjustment along the slot of a slotted bar 30, one bar for each set of fingers so that the fingers may be adjusted with respect to the shearing mechanism and with respect to each other. These bars 30 are carried by a cross bar 31 (see Fig. 1) whereby the bars 30 are suspended above the surface of the table to allow the work to pass beneath. It might be stated that in the construction shown two feed bars are employed, one adjacent each set of fingers.

Each of the fingers 28 is so arranged as to fall into a downward position through the action of gravity and each plate 29 carries a pin 32 which limits the downward movement of the forward end of these fingers. The other portion of the centering mechanism, or the rear centering mechanism, consists in the construction shown of two parts, one of which may be termed a centering means for the initial or trimming cut, and the other of which may be termed the centering means for the subsequent or blank producing cuts, but both of said rear centering mechanisms are alike in that they have the same broad characteristic, namely, that they are swinging members which are capable of swinging away from the shearing mechanism when engaged by the work and of forcing the work backward against the front centering means after the release of the feed bars from the work.

Referring now to the particular form of mechanism employed as a rear centering means for the initial or trimming cut of the work this consists of a pivoted arm or lever 33 (see Figs. 3, 5, 6, and 7) which lever is mounted to swing upon a suitable pin or bearing 34. The upper portion of the lever has connected thereto a coil spring 35, the other end of which spring is affixed to a pin 36 carried by a frame or mounting 37 connected to an angle plate or bar 38 secured in turn to the body of the machine.

By referring to Fig. 1 it will be seen that the frame 37 is positioned approximately centrally of the machine. A finger-like member 39 is pivotally connected to the lower end of the lever 33 and terminates in an acting face 40 and connected to the member 39 is a slotted plate or bar 41, in the slot of which travels a pin 42 connected to a lug or block 43 which in turn is joined to the cross head 13. As shown in Fig. 10 this pin 42 has fixedly mounted thereon outer and inner washers 43ª and mounted upon the pin and interposed between the outer of the washers and a head or nut 44 is a coil spring 45, which maintains the outer washer 43ª by a spring tension against the side of the slotted bar 41.

As the bar 41 rises with the cross head the spring action upon the washer 43 will be sufficient to carry the bar 41 and pin 42 in unison until the finger 39 strikes the upper wall of a recess 46 in a bar 47 fixedly attached to the angle bar 38. This construction is shown in Figs. 3 and 5 to 7 inclusive. When this contact is brought about, movement of the finger 39 is arrested, and thereafter the pin 42 will slide in the slot of the bar 41 and travel upward with the cross head without imparting further movement to the bar 41. As the cross head starts down for the initial portion of the movement the pin 42 and bar 41 will travel in unison owing to the frictional engagement therebetween. But after the lever end of the acting face of the finger 39 has struck the top of the block 48 downward movement of the finger 39 will be arrested and thereafter the pin 42 will travel downward in the slot of the bar 41 without imparting movement to said bar. There is thus brought about a lost motion connection between this finger 39 and the sliding head 31 of the die member, so that the finger 39 is operated only at the initial upward and initial downward movement of the cross head.

I will now describe the entire operation of the initial or trimming cut. The work is fed forward through the instrumentality of the feed fingers 23 of the feed bar 24 until it has passed beyond the first of the fingers 28, the work will be forced forward by the feed bar a greater distance than is required, and such movement will force rearwardly the finger 39 of the rear centering means by reason of contact of the work therewith and place this finger under a spring tension by reason of moving the lever or arm 33 and stretching the spring 35, then as the feed bar retracts and disengages from the work the work will be forced by said spring tension back into position where its rear edge engages with the front face of the rear of the fingers 28; that is it will be placed in the position shown in Fig. 3, the cutter then descends and cuts off that portion of the work which is projecting beyond the same.

Just as the cutting operation is completed, a threaded stem 49 on the member 43 engages with an arm 50 extending from the lever 33 forcing the lower end of said lever back and retracting the finger 39 from engagement with the edge of the work, and the severed or trimmed edge of the work falls into the space 51 between the body of the machine and the holder or receptacle 52, the function of which holder will be more clearly hereinafter explained. The above arrangement will be fully seen by referring to Fig. 2. From the foregoing description it will be seen that by a coöperation between the finger 39 and the first of the fingers 28 a centering means is provided which accurately centers the work with respect to the cutting dies irrespective of the particular throw of the feed bar.

Lying to each side of the finger 39 are fingers 53, each of which is mounted on a support 54 as shown in Fig. 8 which support is in turn connected to the angle iron 38. The fingers or outer centering members 53 each consist of a lever 55 pivoted at 56 and connected to each lever is a coil spring 57. These centering members 53 are used to center the work with respect to the die upon each feeding movement of the work after the initial or trimming cut has been made. Assuming now that said initial cut has been made, the work is advanced by operation of the feed bar beyond the second of the fingers 28 designated by the numeral 28ª in Fig. 3 of the drawings, and such movement by the feed bar forces back the centering members 53 a short distance then when the feeding bar spring tension and releases from the work the work is forced back against the fingers 28ª and so is centered with respect to the shearing mechanism. The die then descends and a blank is formed. After the cutting operation a contact in the form of a threaded stem 59 engages with an arm 60 on each of the members 53 and forces said members backward and out of engagement with the edge of the blank allowing the severed blank to fall into the receptacle 52.

As will be seen from Figs. 1 and 4 there are one of these centering members 53 on each side of the finger 39 and there is of course one threaded stem 59 for each centering member. The supports 54 for these members 53 can be adjusted in and out from the center of the machine as will be understood from referring to Fig. 1. The work is thus fed forward in a step by step manner until the entire sheet of work is severed into blanks of proper dimension. The dimension of the blank can, of course, be varied by rearranging the position of the feed fingers on the feed bar, which fingers are adjustable with respect to said bar, and by rearranging the forward stop fingers 28.

The last of the blanks to be formed slides down a plate 60 adjacent the cutting die and into a receptacle 61 therefor. After the initial cutting or trimming operation the finger 39 will thereafter lie upon the top of the sheet of metal as it is fed forward and will have no further effect as to centering, its sole function relating to the centering of the blank for the trimming cut. The die is so made that as it cuts across the sheet of metal it also cuts for a distance down the sides of the sheets of metal thus trimming the sides of the blank in the necessary manner to permit the proper and ready feeding of the same into the die press.

By referring to Fig. 1 it will be seen that the levers 55, which are the outer rear centering members, are positioned to the inside of the sets of fingers 28. By this arrangement even if the work should bear stronger against one of the rear centering members 55 than the other the work would nevertheless be forced back against both of the fingers 28, and would thus be properly alined, whereas if the centering member 55 were to the outside of the fingers 28 a stronger pressure on one side than the other would tend to twist the work into an oblique position.

I claim:

1. In a machine of the class described, the combination of shearing mechanism, means for advancing the work into position to be acted upon by the shearing mechanism, said means acting in the first instance to position the work with respect to the shearing mechanism to trim an edge thereof and acting upon each subsequent movement to position the work whereby a blank of predetermined width is formed and the same shearing mechanism acting to produce both the trimming and blank forming cuts, substantially as described.

2. In a machine of the class described, the combination of shearing mechanism, means for advancing the work into position to be acted upon by the shearing mechanism, said means acting initially to position the work with respect to the shearing mechanism to trim an edge thereof and acting at each subsequent operation to position the work to produce a blank of predetermined width, and means independent of the feeding means for centering the work with respect to the shearing mechanism prior to each shearing operation, substantially as described.

3. In a machine of the class described, the combination of shearing mechanism, means for advancing the work into position to be operated on by the shearing mechanism, means for centering the work with respect to the shearing mechanism comprising shiftable means arranged beyond the shearing mechanism and shiftable means arranged in front of the shearing mechanism, and means for adjusting the position of the front shiftable means, substantially as described.

4. In a machine of the class described, the combination of shearing mechanism, means for feeding the work into position to be acted upon by the shearing mechanism, means for centering the work with respect to the shearing mechanism comprising tension influenced means beyond the shearing mechanism and coöperating means in front of the shearing mechanism, said latter means comprising gravity actuated fingers, a mounting for said fingers, and means for adjusting the mountings toward and from the shearing mechanism, substantially as described.

5. In a machine of the class described, the combination of shearing mechanism, means for advancing the work into position to be operated upon by the shearing mechanism, means for centering the work with respect to the shearing mechanism comprising shiftable means arranged beyond the shearing mechanism and a series of fingers arranged in front of the shearing mechanism, a plate for each of said fingers, a bar upon which said plates are mounted, and means for adjusting said plates longitudinally of said bar whereby they are moved toward or from the shearing mechanism, substantially as described.

6. In a machine of the class described, the combination of shearing mechanism, means for advancing the work into position to be operated upon by the shearing mechanism, said shearing mechanism acting at the initial operation to produce a trimming cut of the work and at each subsequent operation to produce a blank of predetermined width, means located in front of the shearing mechanism for centering the work with respect to the shearing mechanism, means located beyond the shearing mechanism coöperating with the front centering means to center the work with respect to the shearing means prior to the trimming cut, and means located beyond the shearing means coöperating with the front centering means for centering the work with respect to the shearing means prior to each subsequent blank-producing cut, substantially as described.

7. In a machine of the class described, the combination of shearing mechanism, means for feeding the work into position to be acted upon by the shearing mechanism, said shearing mechanism acting to first produce a trimming cut and subsequently to produce blanks of predetermined width, means for centering the work with respect to the shearing mechanism, comprising means located in front of the shearing mechanism and coöperating means located to the rear of the shearing mechanism, a portion of said rear centering means acting to center the work with respect to the shearing mechanism prior to the trimming cut and the remainder of said rear centering means actuating to center the work with respect to the shearing mechanism prior to each subsequent blank forming cut, substantially as described.

8. In a device of the class described the combination of shearing mechanism, means for feeding the work into position to be acted upon by the shearing mechanism, said shearing mechanism acting to first produce a trimming cut and subsequently to produce blanks of a predetermined width, means located in front of the shearing mechanism for centering the work with respect to said mechanism, centrally disposed means to the rear of the shearing mechanism coöperating with the forward means to center the work with respect to the shearing mechanism prior to the trimming cut, and means coöperating with the forward centering means for centering the work with respect to the shearing means prior to each blank producing cut consisting of companion members located on each side of the centrally disposed member, substantially as described.

9. In a machine of the class described, the combination of shearing mechanism, means for feeding the work into position to be acted upon by the shearing mechanism, said shearing mechanism acting first to produce a trimming cut and subsequently to produce blanks of a predetermined width, means for centering the work with respect to the shearing mechanism prior to the trimming cut consisting of a finger located beyond the shearing means, a mounting for said finger to permit it a horizontal and vertical movement, said work engaging said finger when initially fed forward and moving said finger rearwardly, means for placing a spring tension on said finger when so moved, said tension acting to force the work toward the rear of the machine when the feeding mechanism releases from engagement with the work, means in front of the shearing means for arresting such rearward movement of the work, means for retracting said finger from engagement with the work after the trimming cut has been produced, and means for returning the finger to normal position, substantially as described.

10. In a machine of the class described, the combination of shearing mechanism, means for feeding the work into position to be acted upon by the shearing mechanism, said shearing mechanism acting to first produce a trimming cut, means located to the rear of the shearing mechanism, and coöperating means located to the front of the shearing mechanism for centering the work with respect to the shearing mechanism prior to the trimming cut, said rearwardly disposed centering means comprising a finger, a pivoted lever to which the finger is pivotally attached, said finger being forced rearwardly by contact of the work, means for placing a spring tension on the work when so moved, said tension acting to force the work toward the front of the machine and into engagement with the forward centering means when the feed mechanism disengages from the work, means for lowering the finger into position to be engaged by the work when the shearing mechanism is lowered, means for raising said finger when the shearing mechanism is raised, and means for forcing the finger rearwardly and out of engagement with the work after the trimming cut is produced, and means for centering the work with respect to the shearing mechanism prior to each blank producing operation of the shearing mechanism, substantially as described.

11. In a machine of the class described, the combination of shearing mechanism, means for feeding the work into position to be acted upon by said mechanism, said shearing mechanism acting initially to produce a trimming cut, means for centering the work with respect to the shearing mechanism prior to said shearing cut embodying means arranged in front of the cutting mechanism, and coöperating means arranged to the rear thereof, said rearwardly means comprising a vertically extending pivoted lever, a spring connected to said lever, a finger pivotally connected to said lever and a connection between said finger and the cross head of the shearing mechanism whereby said finger is raised and lowered in conformity with the operation of said cross head, substantially as described.

12. In a machine of the class described, the combination of shearing mechanism, means for feeding the work into position to be acted upon by said mechanism, said shearing mechanism acting initially to produce a trimming cut, means for centering the work with respect to the shearing mechanism prior to said shearing cut, embodying means arranged in front of the shearing mechanism, and coöperating means arranged to the rear thereof, said rearward means comprising a vertically extending pivoted lever, a spring connected to said lever, a finger pivotally connected to said lever, a connection between said finger and the cross head of the shearing mechanism whereby said finger is raised and lowered in conformity with the operation of said cross head, and means located to the rear of said shearing mechanism and coöperating with said forward centering means to center the work prior to each blank-producing operation, substantially as described.

13. In a machine of the class described, the combination of shearing mechanism, means for feeding the work into position to be acted upon by said shearing mechanism, the initial operation of said shearing mechanism producing a trimming cut, means located in front of the shearing mechanism coöperating with means located to the rear of the shearing mechanism for centering the work with respect to the shearing mechanism prior to the trimming cut, said rearwardly located means embodying a pivoted vertically extending lever, tension means connected to said lever, a finger pivoted to said lever, a slotted bar connected to said finger, a lost motion connection between said slotted bar and the shearing mechanism whereby said finger is raised on the initial upward movement of the shearing mechanism and lowered upon the initial downward movement of said shearing mechanism, and means for moving the finger away from the work after the completion of the shearing cut, substantially as described.

14. In a machine of the class described, the combination of shearing mechanism, means for feeding the work into position to be acted upon by said shearing mechanism, said shearing mechanism acting at the initial operation to produce a trimming cut, means located to the front of the shearing mechanism, and coöperating means located to the rear of the shearing mechanism for centering the work with respect to the shearing mechanism prior to said trimming cut, said rearwardly located means comprising a vertically extending pivoted lever, a finger attached to said lever, a spring attached to said lever, a vertically depending stationary bar having a slot therein through which said finger extends, said slot being of greater width than the width of the finger, a connection between said finger and the shearing mechanism whereby said finger is raised at the initial upper movement of said shearing mechanism and lowered at the initial downward movement of said shearing mechanism, and means carried by said shearing mechanism for actuating said lever to force the finger out of engagement with the work after the trimming operation, substantially as described.

15. In a machine of the class described, the combination of shearing mechanism, means for feeding the work into position to be acted upon by the shearing mechanism, said shearing mechanism acting on the initial operation to produce a trimming cut and acting upon subsequent operations to produce a blank of predetermined width, means located in front of the shearing mechanism, and coöperating means centrally disposed of the machine and to the rear of the shearing mechanism for centering the work with respect to the shearing mechanism prior to the trimming cut, and members to the rear of the shearing mechanism disposed to each side of the machine and coöperating with the front members to center the work with respect to the shearing mechanism prior to the blank producing cuts, said side disposed rear members consisting of vertically extending pivoted arms arranged to be engaged by the work and forced rearwardly and tension mechanism for placing a tension on said arm when the same are forced rearwardly, substantially as described.

16. In a machine of the class described, the combination of shearing mechanism, means for feeding the work into position to be acted upon by the shearing mechanism, said shearing mechanism acting on the initial operation to produce a trimming cut and acting upon subsequent operations to produce a blank of predetermined width, means located in front of the shearing mechanism, and coöperating means centrally disposed of the machine and to the rear of the shearing mechanism for centering the work with respect to the shearing mechanism prior to the trimming cut, and members to the rear of the shearing mechanism and disposed to each side of the mechanism coöperating with the front members to center the work with respect to the shearing mechanism prior to the blank producing cuts, said side disposed rear members consisting of pivoted arms arranged to be engaged by the work and forced rearwardly, tension mechanism for placing a tension on said arms when the same are forced rearwardly, and means for adjusting said side disposed rear centering members toward and from the center of the machine.

17. In a machine of the class described, the combination of shearing mechanism, means for feeding the work into position to be acted upon by the shearing mechanism, said shearing mechanism acting on the initial operation to produce a trimming cut and acting upon subsequent operations to produce a blank of predetermined width, means located in front of the shearing mechanism, and coöperating means centrally disposed of the machine and to the rear of the shearing mechanism for centering the work with respect to the shearing mechanism prior to the trimming cut, and members to the rear of the shearing mechanism and disposed to each side of the machine and coöperating with the front members to center the work with respect to the shearing mechanism prior to the blank producing cuts, said side disposed rear members consisting of pivoted arms arranged to be engaged by the work, means for placing a tension on said arms when the same are forced rearwardly, means for adjusting said side disposed rear centering members toward and from the center of the machine, and means carried by the shearing mechanism for releasing said rearward centering member from engagement with the work after the cutting operation, substantially as described.

18. In a machine of the class described, the combination of shearing mechanism, means for feeding the work into position to be acted upon by the shearing mechanism, said shearing mechanism initially acting to produce a trimming cut and subsequently acting to produce blanks of predetermined width, means for centering the work with respect to the shearing mechanism prior to each shearing operation, a plurality of receptacles for receiving the cut blanks and one of said receptacles being located beyond the shearing mechanism spaced away from the machine a distance to form a discharge way for the material cut by the trimming operation, substantially as described.

CHARLES D. McDONALD.

Witnesses:
C. B. McDonald,
Chas. E. Eaves.